Figure 1:
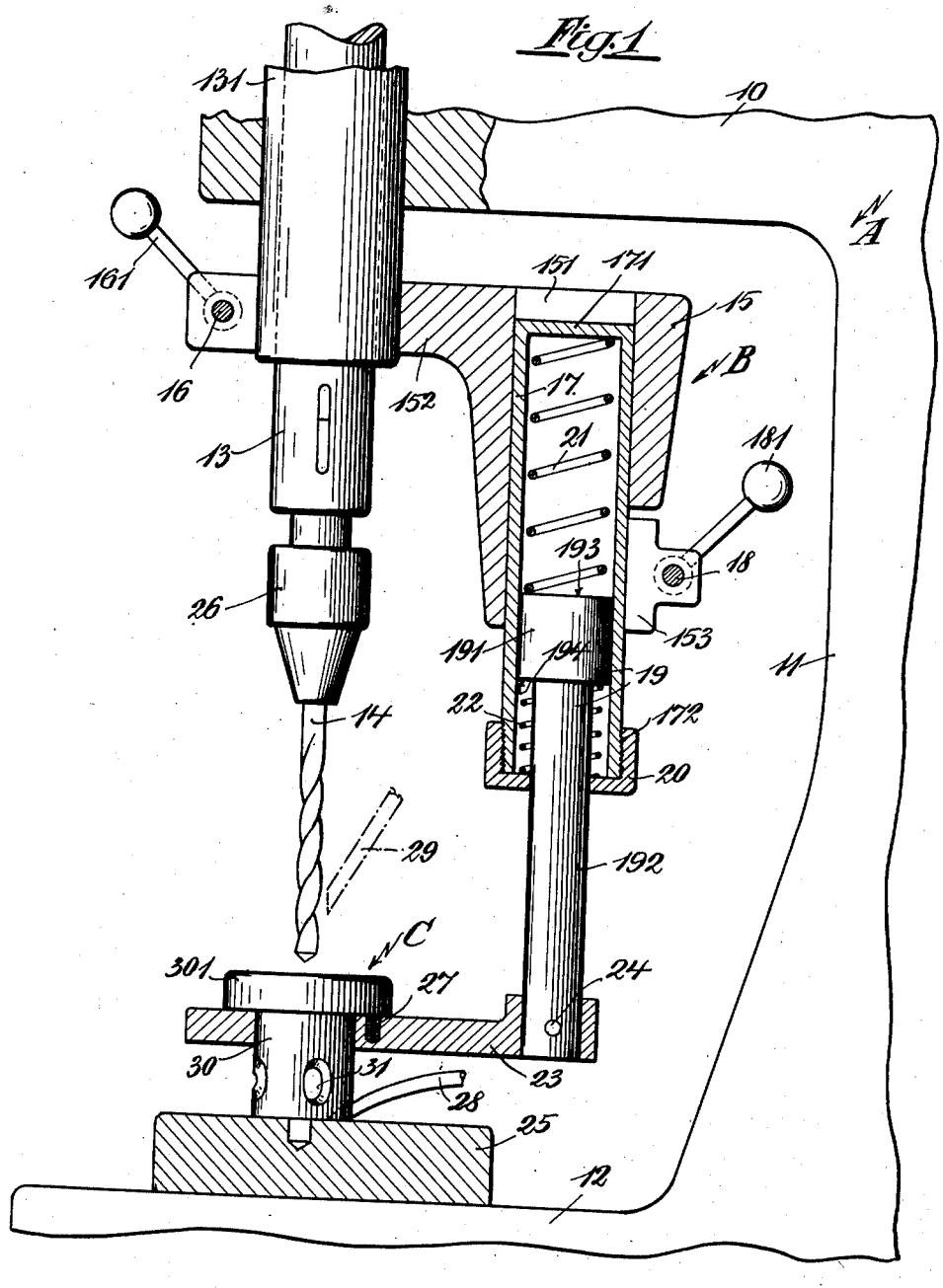

Feb. 23, 1954

A. HÜLLER 2,669,889

CHIP BREAKING DEVICE

Filed April 1, 1953

2 Sheets-Sheet 1

INVENTOR:
ADOLF HÜLLER
BY:

Feb. 23, 1954
A. HÜLLER
2,669,889
CHIP BREAKING DEVICE
Filed April 1, 1953
2 Sheets-Sheet 2
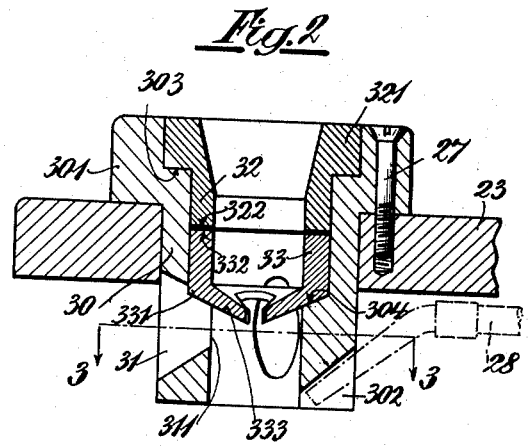
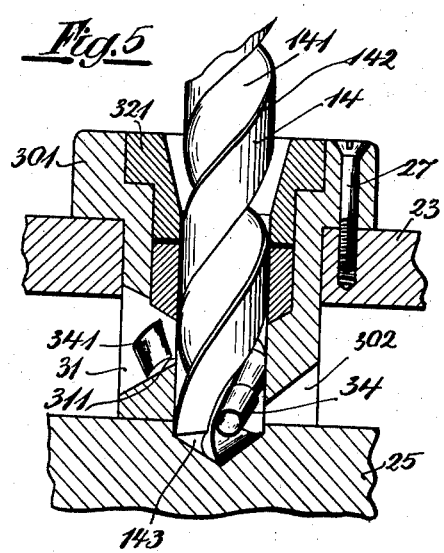
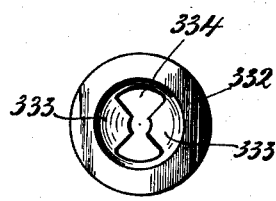
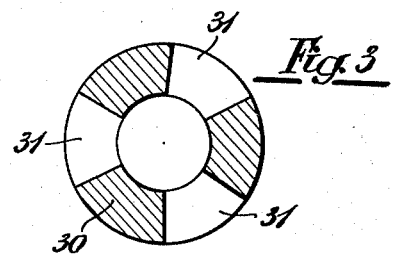
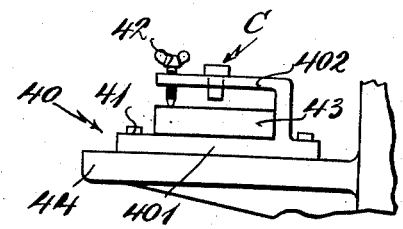
INVENTOR:
ADOLF HÜLLER
BY:

Patented Feb. 23, 1954

2,669,889

UNITED STATES PATENT OFFICE 2,669,889

CHIP BREAKING DEVICE

Adolf Hüller, Ludwigsburg, Germany

Application April 1, 1953, Serial No. 346,091

5 Claims. (Cl. 77—55)

The invention relates to a chip breaking device for breaking long chips produced when drilling work by means of a twist drill into small pieces.

It is an object of the present invention to provide a chip breaking device of simple and durable design, which may readily be attached to a drill press or a drill jig.

It is a further object of the invention to provide a chip breaking device which effectively cuts long chips into small pieces.

Other objects of the present invention will become apparent from the following description when considered in connection with the accompanying drawing, in which:

Fig. 1 is a partial side view of a drill press partly in section with the chip breaking device according to the invention fastened to a holding attachment, Fig. 2 is a longitudinal sectional view of the chip breaking device, Fig. 3 is a transverse section on line 3—3 of Fig. 2, Fig. 4 is a top view of the chip deflector of the chip breaking device according to Fig. 2, Fig. 5 is a longitudinal sectional view of the chip breaking device in operation, Fig. 6 is a side view of another attachment for holding the chip breaking device according to the invention.

A preferred embodiment of my invention mainly comprises a sleeve member through which the drill is adapted to be directed, said sleeve having at least one hole near its lower end portion forming an inner cutting edge, holding means adapted to hold said sleeve member stationary during the drilling operation, a deflecting element rotatably arranged in said sleeve member, a bottom wall provided on said deflecting element, said wall having a central opening of the shape of the cross-section of a twist drill, and limiting means for limiting the axial motion of said rotatably arranged deflecting element in both directions.

In a partly shown machine frame A of a drill press having a head portion 10, a table 12 and a back portion 11, a spindle 13 is rotatably but non-slidably arranged in a sleeve 131, the latter being axially slidably provided in the machine frame in known manner. The driving means for driving spindle 13 are not shown in the drawing, since they form no part of the invention. In spindle 13 a drill chuck 26 of known construction is non-rotatably secured, in which a twist drill 14 of conventional design is clamped in place.

Attached to sleeve 131 is a holding attachment B which will now be described.

The holding attachment B comprises a holding member 15 having a cylindrical hole 151 parallel to the axis of spindle 13. A slotted clamping portion 152 of said holding member fits over sleeve 131. By means of a clamping device 16 with an operating handle 161, said clamping portion 152 and thus the entire holding attachment B is fastened to sleeve 131 in known manner. The holding member 15 receives in its hole 151 an intermediate member 17 which is closed at its upper end by means of a top wall 171 and provided at its lower end with a thread 172, said intermediate member 17 being adjustably attached to holding member 15 by means of a clamping device 18. The latter forces with its operating handle 181 the clamping portions 153 of holding member 15 together with the result that the intermediate member 17 is secured in place with respect to the holding member 15. Disposed in hole 171 of the intermediate member 17 is a piston member 19 having a cylindrical portion 191 slidably fitting into said hole 171 and a cylindrical portion 192 of smaller diameter extending through the lower opening of the intermediate member 17 and also through a cap 20 screwed on the threaded end portion of intermediate member 17. Inside the intermediate member 17 two helical springs 21 and 22 are arranged, the first bearing against the circular face 193 of piston member 19 and the top wall 171 of the intermediate member 17, and the second abutting the annular surface 194 of piston member 19 and the inside surface of cap 20. Fastened to the downwardly extending end of portion 192 by means of a fastening pin 24 is a bracket 23 which carries a chip breaking device C resting in operating position with its lower surface on the upper surface of work 25 clamped to the table 12 in known manner not shown in the drawing, e. g. by magnetic or mechanical means. The chip breaking device C is fastened to bracket 23 by a screw 27 extending through a hole of said device and screwed into a threaded hole of said bracket. Cooling liquid may be passed through a line 28 to the lower part of the chip breaking device C from where it may be supplied through a recess to drill 14 when the latter is in operating position. Another position of the cooling liquid line is shown in dot-dash lines above the chip breaking device at 29.

The chip breaking device C (vide especially Figs. 2 to 5) comprises a bushing 30 which rests with its flange 301 on the upper surface of the aforementioned bracket 23 and extends with its lower portion through a hole of that bracket. At the lower portion of bushing 30 projecting downwardly from bracket 23 three holes 31 are provided having the shape of a truncated cone so that the cross-section of the holes increases steadily in radial direction starting from the innermost portion of the hole, the latter forming cutting edges 311 whose function will be described further down. At the lower end portion of bushing 30 a recess 302 is provided for receiving the pipe end of pipe 28 through which cooling liquid may be supplied to the twist drill 14. The bushing 30 is fitted with an upper internal shoulder 303 and a lower internal shoulder 304 of tapered shape. A guiding sleeve 32 having a conical opening and a flange 321 fitting on the shoulder 303 is pressed into the bushing 30, so as to be rigidly attached to the latter. Below the guiding sleeve 32 a chip deflector 33 is rotatably arranged in bushing 30, the conical bottom wall 333 of the chip deflector 33 resting on the tapered shoulder 304 of bushing 30 as shown in Fig. 2, for instance when the chip breaking device C is not in operation. The lower shoulder 304 is provided at such a place that the lower outside portion 331 of the chip deflector 33 extends partly into the holes 31. The axial play of the chip deflector 33 between shoulder 304 and the lower face 322 of guiding sleeve 32 is such that the deflector 33 still extends with the aforementioned portion 331 somewhat into holes 31 when the chip deflector is in its uppermost position, i. e., when face 332 of the chip deflector abuts face 322 of guiding sleeve 32. In the conical bottom wall 333 of the chip deflector 33 an opening 334 is provided having the shape of the cross-section of twist drill 14, but being somewhat larger than the latter in order to admit cooling liquid flowing downward from the upper portion of the chip breaking device, when the cooling liquid line is arranged in the position shown in dot-dash lines in Fig. 1.

The operation of the chip breaking device will now be explained especially in connection with Figs. 1 and 5. When spindle 13 is in its upper position, spring 21 being stronger than spring 22 forces piston member 19 into its lowermost position with respect to the intermediate member 17. When spindle 13 is moved downward a certain length, the chip breaking device C will abut the upper surface of work 25, whereupon the downward motion of bracket 23 together with the chip breaking device C attached to it will come to an end. When spindle 13 is moved still further in downward direction, spring 21 will be compressed by the intermediate member 17 moving downward together with holding member 15 secured to sleeve 131. Now the drill 14 will enter the chip breaking device C through the internal hole of guiding member 32 and pass through opening 334 of chip deflector 33. When the tip 143 of drill 14 is fed beyond the lower face of bushing 30 the drilling operation will start. The revolving drill 14 will also rotate the chip deflector 33 inasmuch as the bottom wall 333 extends into the flutes 141 of twist drill 14 and is thus forced to revolve. The remaining parts of the chip breaking device C will remain stationary, since bushing 30 is secured to bracket 23 which also remains stationary during the drilling operation.

When drill 14 rotates and is fed into work 25 in known manner, the drill will cut off long curled chips 34 which slide upwards in the flutes 141 of drill 14. When the curled chips 34 reach the lower surface of bottom wall 333 of chip deflector 33, they will raise the chip deflector 33 into its uppermost position and be deflected towards holes 31 through which they try to escape. When the chips have progressed a certain small length through holes 31, the lands 142 of the rotating drill 14 will, when passing the cutting edges 311 of holes 31, cut off short pieces 341 extending into the holes 31, said pieces depending in their lengths on the speed of drill 14.

By the arrangement of portion 331 extending somewhat into the holes 31 it is insured that chips 34 reach the holes 31 readily without any obstruction.

In Fig. 6 another mode of holding the chip breaking device is shown. On a table 44 of a machine frame a fixture 40 is fastened by means of screws 41, the fixture comprising a lower plate 401 on which a work piece 43 rests and an upper bracket 402 extending over work 43. Through an adjustable screw 42 the work is secured in place. The chip breaking device C is provided in a hole of the bracket 402 of fixture 40, where it is rigidly held in place by known means, e. g., a screw screwed into a threaded hole of bracket 402.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. Chip breaking device for breaking long chips produced when drilling work by means of a twist drill into small pieces comprising a sleeve member through which the drill is adapted to be directed, said sleeve having at least one hole near its lower end portion forming an inner cutting edge, holding means adapted to hold said sleeve member stationary during the drilling operation, a deflecting element rotatably arranged in said sleeve member, a bottom wall provided on said deflecting element, said wall having a central opening of such shape that at least one driving portion extends into a flute of a twist drill passing through said opening, limiting means for limiting the axial motion of said rotatably arranged deflecting element in both directions.

2. Chip breaking device for breaking long chips produced when drilling work by means of a twist drill into small pieces comprising a sleeve member through which the drill is adapted to be directed, said sleeve having three holes disposed by 120° near its lower end portion forming an inner cutting edge, holding means adapted to hold said sleeve member stationary during the drilling operation, a deflecting element rotatably arranged in said sleeve member, a bottom wall provided on said deflecting element, said wall having a central opening of the shape of the cross-section of a twist drill, limiting means for limiting the axial motion of said rotatably arranged deflecting element in both directions.

3. Chip breaking device for breaking long chips produced when drilling work by means of a twist drill comprising a sleeve member through which the drill is adapted to be directed, said sleeve being fitted with at least one hole near its lower end portion forming an inner cutting edge, said sleeve having an internal shoulder, a holding means adapted to hold said sleeve member stationary during the drilling operation, a deflecting element rotatably arranged in said sleeve member, a bottom wall provided on said deflecting element, said wall having a central opening of the shape of the cross-section of a twist drill, said shoulder limiting the downward axial motion of said deflecting element, limiting means for limiting the axial motion of the deflecting element in upward direction.

4. Chip breaking device for breaking long chips produced when drilling work by means of a twist drill comprising a sleeve member through which the drill is adapted to be directed, said sleeve being fitted with at least one hole near its lower end portion forming an inner cutting edge, said sleeve having an internal tapered shoulder, a holding means adapted to hold said sleeve member stationary during the drilling operation, a deflecting element rotatably arranged in said sleeve member, a conical bottom wall provided on said deflecting element, said wall having a central opening of the shape of the cross-section of a twist drill, said shoulder limiting the downward axial motion of said deflecting element, limiting means for limiting the axial motion of the deflecting element in upward direction.

5. Chip breaking device for breaking long chips produced when drilling work by means of a twist drill comprising a sleeve member through which the drill is adapted to be directed, said sleeve being fitted with at least one hole near its lower end portion forming an inner cutting edge, said sleeve having an internal shoulder, a holding means adapted to hold said sleeve member stationary during the drilling operation, a deflecting element rotatably arranged in said sleeve member, a bottom wall provided on said deflecting element, said wall having a central opening of the shape of the cross-section of a twist drill, said shoulder limiting the downward axial motion of said deflecting element, a guiding member fitting into the inside of the sleeve member secured to the upper portion of same, said guiding member having a hole for receiving the drill and serving as upper limiting means for limiting the axial motion of the deflecting member.

ADOLF HÜLLER.

References Cited in the file of this patent
UNITED STATES PATENTS

| Number | Name | Date |
|---|---|---|
| 913,455 | Berger et al. | Feb. 23, 1909 |
| 1,617,554 | Swartz | Feb. 15, 1927 |
| 2,375,367 | Johnson | May 8, 1945 |